Patented Sept. 2, 1941

2,254,615

UNITED STATES PATENT OFFICE 2,254,615

PRODUCTION OF SATURATED CARBONYLIC COMPOUNDS

Sumner H. McAllister, Lafayette, and William A. Bailey, Jr., Berkeley, Calif., assignors to Shell Development Company, San Francisco, Calif., a corporation of California No Drawing. Application November 28, 1940, Serial No. 367,566

11 Claims. (Cl. 260—593)

The present invention relates to the manufacture and separation of saturated ketones and aldehydes, and is more particularly directed to a novel process of obtaining saturated ketones or aldehydes which are substantially free from the corresponding unsaturated ketones or aldehydes.

It is known that relatively higher boiling ketones, such as methyl isobutyl ketone, methyl isoamyl ketone, and the like, may be readily prepared by the hydrogenation of the corresponding alpha-beta-unsaturated ketones, e. g. mesityl oxide, isobutylidene acetone, etc. Such hydrogenation, however, cannot be effectively conducted to complete saturation of the ethylenic linkages of the unsaturated ketones because any attempt in such a direction usually effects a material lowering of the yield of the saturated ketones due to the side-reactions which, under relatively rigorous hydrogenating conditions, cause the conversion of the saturated ketones to the corresponding alcohols and even hydrocarbons due to an interaction of the introduced hydrogen with the carbonyl group of the ketone. Therefore, in order to obtain high yields of the desired saturated ketones, it is generally necessary to effect the hydrogenation of the corresponding unsaturated ketones, such as the alpha-beta unsaturated ketones, under relatively mild hydrogenating conditions which will not cause the conversion of the ketones to alcohols and/or hydrocarbons. When effected under such conditions, the products resulting from the hydrogenation still contain relatively large quantities or percentages of the unsaturated ketone.

Although the saturated and unsaturated ketones find a number of applications in which both of these types of ketones may be used either separately or in mixtures with each other, there is a number of instances where the presence of unsaturated ketones in the corresponding saturated ketones renders the latter substantially useless or, at least, highly undesirable. For instance, both mesityl oxide and the corresponding saturated ketone (methyl isobutyl ketone) are extensively employed as solvents for synthetic rubbers, nitrocellulose, gums and resins, and particularly some of the vinyl resins. In many instances, the solvent for the above-mentioned compounds may consist of either ketone employed separately. Also, mixtures of mesityl oxide and methyl isobutyl ketone may be employed as the solvent. However, there is a number of cases where it is highly desirable, if not essential, to employ a solvent consisting of pure or substantially pure methyl isobutyl ketone. For example, the presence of mesityl oxide in methyl isobutyl ketone is highly undesirable when the latter is employed as a solvent in the manufacture of photographic film. This is due to the fact that the mesityl oxide, being a relatively unstable compound, polymerizes or is oxidized even under storage conditions, so that the use of such mixtures of the saturated and unsaturated ketones as the solvent results in the production of films which are clouded and thus inferior in quality.

Attempts have been heretofore made to separate saturated ketones from mixtures containing the same and the corresponding unsaturated ketones. For instance, such mixtures were subjected to distillation. However, due to the close proximity of the boiling temperatures of the corresponding saturated and unsaturated ketones, it was found that effective and substantial separation of the two ketones is highly difficult, if not impossible, unless very efficient and complicated distillation units are employed. This increases the cost of purification or separation of the ketone mixtures, and also renders the operations highly cumbersome. Also, the separation of saturated aldehydes from the corresponding unsaturated aldehydes normally necessitates the use of very costly and cumbersome distillation units.

It is, therefore, the main object of the present invention to provide a simple and efficient process for producing and recovering saturated ketones or aldehydes which are substantially free from the corresponding unsaturated ketones or aldehydes. Another object of the invention is to provide a process whereby relatively higher boiling saturated ketones or aldehydes which are free from the corresponding unsaturated compounds may be readily produced in high yields from relatively lower boiling ketones and/or aldehydes. A still further object of the invention is to provide a process whereby saturated ketones or aldehydes may be effectively and economically separated in a substantially pure state and in high yields from mixtures consisting of or predominating in these saturated ketones or aldehydes, and the corresponding unsaturated compounds, and particularly from mixtures of the above class of compounds which are produced by the hydrogenation of unsaturated ketones or unsaturated aldehydes resulting from a condensation of relatively lower boiling ketones and/or aldehydes. Other objects of the invention will be readily apparent from the following disclosure of the present invention and of the preferred embodiments thereof.

It has now been discovered that the above and other objects may be attained by subjecting mixtures containing both the saturated and unsaturated ketones or aldehydes (these saturated and unsaturated constituents of such mixtures boiling within such a relatively narrow temperature range as to render their separation by distillation difficult if not substantially impossible) to the action of water in the presence of basic-reacting compound under such conditions of temperature and pressure as to render the unsaturated constituents readily separable from the corresponding saturated compounds. The mixture resulting from such a treatment may then be subjected, for example, to fractional distillation to recover separately the unaltered saturated ketones or aldehydes in a substantially pure state and therefore substantially free from the corresponding unsaturated compounds present in the mixture subjected to the aforesaid treatment. In most cases, and particularly when relatively weak aqueous solutions of the basic or basic-reacting compound are employed, the unsaturated ketones or aldehydes are decomposed to produce lower boiling ketones and/or aldehydes. However, under certain operating conditions, there occurs a condensation of the unsaturated ketones or aldehydes to produce compounds having a high boiling temperature. In either case, the catalytic treatment of the mixtures with the aqueous solutions of the basic compound, e. g. aqueous caustic solutions, converts the unsaturated ketones or aldehydes into compounds which have such a widely different boiling temperature from that of the saturated ketones or aldehydes in the treated mixture, that the separation of the latter in a substantially pure state may be readily and economically effected by simple and well-known methods, such as ordinary fractional distillation.

The catalytic conversion of the unsaturated constituents in mixtures containing saturated ketones or aldehydes and the corresponding unsaturated compounds, may be effected by commingling such mixtures with water containing the above-mentioned and hereinbelow more fully described basic or basic-reacting compound, and by subjecting such aqueous mixtures or solutions to elevated temperatures. This effects a hydrolysis of the unsaturated ketones or aldehydes, followed by a splitting of each hydrolyzed molecule to produce at least two molecules having considerably lower boiling temperatures than those of the unsaturated ketone or aldehyde subjected to the treatment. For example, when a mixture of methyl isobutyl ketone and mesityl oxide is commingled with several volumes of an aqueous solution of a basic compound, such as sodium hydroxide, and the mixture thus formed is subjected to reflux distillation at atmospheric pressure, the mesityl oxide is hydrolyzed and is decomposed to produce two molecules of acetone per molecule of mesityl oxide. The acetone, which boils considerably below methyl isobutyl ketone, may be readily removed during or subsequent to the reaction, thus permitting the recovery of methyl isobutyl ketone which is substantially free from mesityl oxide.

Although the hydrolysis of the unsaturated ketones, etc., may be effected by conducting the reaction at atmospheric pressure and under reflux conditions, the reaction when thus effected proceeds very slowly so that excessively long periods of time are necessary to convert the unsaturated compounds to compounds having a lower or higher boiling point. It has now been further discovered that the use of temperatures above 100° C. greatly increases the rate of reaction without substantially affecting the saturated ketones or aldehydes present in the mixtures subjected to treatment. This is attained by effecting the reaction at superatmospheric pressures. This discovery is surprising and quite unexpected since it would be normally expected that an increase in the reaction temperatures and pressures would cause the condensation of the saturated ketones or aldehydes present in the mixtures subjected to treatment, it being known that basic compounds catalyze this condensation reaction. However, contrary to such general expectations, the use of superatmospheric pressures and of temperatures above 100° C. permits relatively rapid hydrolysis of the unsaturated ketone and/or aldehydes (and the decomposition of such hydrolyzed compounds into the relatively lower boiling ketones and/or aldehydes) without any measurable formation of condensation products of the saturated ketones and/or aldehydes. The effecting of the aforementioned reaction at elevated temperatures and pressure also allows the use of relatively weak concentrations of the basic compound without materially affecting the degree and rate of conversion of the unsaturated constituents of the reaction mixture into lower boiling compounds which may be readily separated therefrom as by fractional distillation. This is quite advantageous since the more concentrated solutions of the basic compounds generally tend to promote or induce the condensation of the unsaturated ketones and aldehydes to the correspondingly higher boiling compounds. The use of the weaker concentrations of the basic compound therefore increases the overall yield of saturated ketones or aldehydes since the corresponding unsaturated compounds are converted into the lower boiling ketones and/or aldehydes which may then be separated and re-condensed to produce additional quantities of unsaturated condensation products. These may then be again hydrogenated to form the desired saturated ketones or aldehydes which may be recovered by the above-outlined process. For example, with particular reference to the production and recovery of high yields of substantially pure methyl isobutyl ketone according to the process of the present invention, acetone may first be converted to the corresponding ketol according to the following equation:

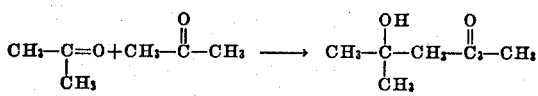

This ketol may be dehydrated to mesityl oxide, which, in turn, may be subjected to incomplete hydrogenation to form a mixture predominating in methyl isobutyl ketone but containing excessive amounts of unreacted mesityl oxide. By subjecting this mixture according to the present invention to the action of water in the presence of a small amount of a basic compound, e. g. a dilute aqueous solution of caustic soda, at superatmospheric pressures and temperatures of above 100° C., substantially all of the mesityl oxide (due to hydrolysis and a splitting reaction) is reconverted back to acetone which may be readily recovered. This acetone may then be re-utilized to form additional quantities of methyl isobutyl ketone, thus increasing the overall yield thereof. When effected according to the preferred embodiment of the invention, the separation of the methyl isobutyl ketone from mixtures thereof with mesityl oxide is substantially quantitative, there being substantially no side reactions of the type of condensation either of the mesityl oxide or of the methyl isobutyl ketone.

The hydrolysis and simultaneous decomposition of the unsaturated condensation products (i. e. the unsaturated ketones or aldehydes remaining unconverted after the described hydrogenation step) is effected according to the present invention by commingling the mixtures containing the saturated and unsaturated condensation products with an excess quantity of water containing a relatively small amount or concentration of a basic compound, and by subjecting the resulting mixture to superatmospheric pressures and to elevated temperatures which are above the boiling temperature of the mixture at atmospheric pressure. Under such conditions the unsaturated constituents are relatively rapidly hydrolyzed and then decomposed into products which boil at a considerably lower temperature than that of the unaltered saturated condensation products. The reaction mixture may be fractionally distilled to recover separately the hydrogenated and therefore saturated condensation products substantially free from the corresponding unsaturated compounds.

Although the optimum operating temperature for the decomposition of the unsaturated constituents in the reaction mixture will vary depending on a number of variables, such as the specific mixture treated, the basic catalyst employed, its concentration in the mixture, the operating pressure, etc., it may be generally stated that the reaction should be effected at temperatures above 100° C., the preferred temperatures being above 150° C. The upper temperature limit for this reaction is usually determined by the occurrence of side reactions, such as condensation and/or pyrolytic decomposition reactions, which usually occur when excessively high temperatures at the existing operating pressure are employed. In order to permit the use of these temperatures it is necessary to employ superatmospheric pressures which will vary within wide limits depending on the aforementioned conditions. At these superatmospheric pressures at least a portion of the reactant mixture is maintained in a liquid state. Excessively high pressures are, however, to be avoided because of the occurrence of undesirable side reactions. Generally, pressures of above 100 pounds per square inch but below those at which undesirable side reactions will occur, are to be preferred.

It was pointed out above that the use of superatmospheric pressures and elevated temperatures (which are preferably above 100° C.) considerably increases the reaction rate and also permits the use of relatively dilute or low concentrations of the basic compound. Although the reaction period may vary within relatively wide limits, it may be generally stated that the hydrolysis and decomposition of the unsaturated condensation products in the reaction mixtures is substantially complete within a few minutes (for example, about fifteen minutes) when the reaction is effected at temperatures in the neighborhood of about 150° C. and at pressures of about 100 to 150 pounds per square inch, with an aqueous solution of a basic compound, said solution having a hydrogen ion concentration equal to that of a tenth-normal solution of sodium hydroxide. The reaction time necessary for the conversion of, for example, mesityl oxide to acetone will be shorter with increase concentrations of the basic compound employed as the catalyst, and vice versa. As to the catalyst, it is possible to employ any basic or basic-reacting compound capable of promoting the desired hydrolysis and decomposition of the unsaturated condensation products in the treated mixture. The basic compound may be any suitable basic metal compound such as metal hydroxides, carbonates, borates, etc., which are alkaline-reacting and capable of effecting the desired result. A preferred group of basic-reacting compounds includes the alkali- and alkaline-earth metal hydroxides, as well as suitable basic-reacting salts of strong bases and weak acids such as the carbonates, borates, etc. The quantity of the basic compound may vary depending on the basicity of the specific catalyst employed. For instance, it is necessary to employ a somewhat larger amount or concentration of a weak base as compared to the quantity or concentration necessary for the same degree of conversion (other conditions being equal) when a strongly basic compound is used as the catalyst. Although weakly basic solutions may be employed, such aqueous solutions will require excessive periods of time to catalyze the hydrolysis and splitting of the unsaturated condensation products. Therefore, as a general rule, it is preferable to employ solutions of a basicity not materially lower than that of a one-tenth normal solution of sodium hydroxide. However, in some cases, solutions having a considerably lower basicity, e. g. as low as that of a one-hundredth normal solution of NaOH, may be used. As to the upper limit, it was pointed out above that excessively high concentrations of strongly basic compounds promote the condensation of the unsaturated ketones and/or aldehydes, and should therefore be generally avoided. The practical upper limit will vary with the other operating conditions, e. g. temperatures and pressures employed. For example, by lowering the pressures and temperatures it is possible, and frequently desirable, to employ relatively higher concentrations of compounds which are strongly basic, whereas, when operating at elevated temperatures and pressures, the same degree of conversion is attainable by using smaller amounts of a weaker basic compound which may be employed in relatively lower concentrations. The quantity of water (containing the aforementioned basic or basic-reacting catalyst) which is to be employed for the hydrolysis and splitting reaction, may also vary. However, in most cases it is preferable to employ the water in a quantity greatly in excess of that necessary for the hydrolysis of the unsaturated compounds of the treated mixture.

The following specific examples illustrate the nature and mode of execution of one phase of the invention. The examples, however, are not to be taken as limiting the invention to the particular reactants, proportions and operating conditions specified therein.

*Example I*

A mixture consisting of methyl isobutyl ketone and 8.84% by weight of mesityl oxide was commingled with about 200 volume per cent of an aqueous 0.1 normal solution of sodium hydroxide. This aqueous mixture was then introduced into an autoclave and quickly heated to about 150° C., at which temperature the mixture was maintained for about fifteen minutes. The pressure in the autoclave was equal to about 115 pounds per square inch. At the end of the above reaction period, the reaction mixture was quickly cooled to about 15° C. to 20° C. and fractionally distilled from the reactor. After the removal of the acetone (formed by hydrolysis of the mesityl oxide and the splitting of the product of this hydrolysis), a fraction boiling between about 75° C. and 100° C. was obtained, this fraction consisting of methyl isobutyl ketone and some mesityl oxide and water. After separation of the water by stratification, and the drying of the upper layer with anhydrous sodium sulphate, an analysis of this fraction indicated that it contained only about 1.72% by weight of mesityl oxide. Therefore, about 82% of the mesityl oxide originally present in the feed was converted to acetone.

*Example II*

A mixture of methyl isobutyl ketone and mesityl oxide (this mixture containing 11.00% by weight of the latter) was commingled with 200 volume per cent of an aqueous 0.1 normal solution of sodium hydroxide, and subjected for a period of about fifteen minutes to a temperature of about 160° C. in an autoclave wherein the mixture was maintained at a pressure of about 140 pounds per square inch. At the end of the above period of time the reaction product was first cooled and then distilled as described in the previous example. The methyl isobutyl ketone was recovered substantially quantitatively, mesityl oxide being present in this fraction in a quantity equal to about 0.61 weight per cent. In other words, 95% of the mesityl oxide originally present in the feed was converted to acetone which was separately removed.

*Example III*

Methyl isobutyl ketone containing about 9.5% by weight of mesityl oxide was commingled with two volumes of a normal aqueous solution of sodium hydroxide. This mixture was then treated under the same conditions and analyzed in the same manner as described in Example I. It was found that about 97% of the mesityl oxide was converted to acetone, the methyl isobutyl ketone containing only about 0.36% by weight of mesityl oxide.

Although the process has been described with particular reference to batch purification of mixtures containing saturated and unsaturated condensation products, it is to be understood that this process may also be realized in an intermittent or continuous manner. For example, the mixtures to be treated, together with desired or optimum quantities of an aqueous basic-reacting solution, may be continuously introduced into a reactor which is maintained under the above-defined superatmospheric pressures and temperatures. The reaction products may then be withdrawn from such reactor continuously, and be fractionated to recover the unaltered saturated constituent of the introduced mixture. Also, the product of decomposition of the unsaturated ketones or aldehydes may be withdrawn directly from the reactor by maintaining the reactor under such a pressure and temperature as will assure the vaporization of the obtained product of decomposition. In such a case it is preferable to maintain refluxing conditions in the reactor to prevent the overhead removal of the unaltered saturated condensation product.

Although the mixtures of unsaturated and saturated condensation products which may be separated according to this process, may be produced in any known manner, one of the preferred methods comprises condensation of low-boiling ketones and/or aldehydes to form unsaturated higher-boiling ketones or aldehydes, followed by an incomplete hydrogenation of the resultant unsaturated condensation product.

Any aliphatic, alicyclic or aliphatic-alicyclic ketone and/or aliphatic or cycloparaffinic aldehyde may be employed in the manufacture of the unsaturated condensation products which are the intermediates in the production, via hydrogenation, of the corresponding saturated condensation products. Particularly suitable primary materials consist of the aliphatic, alicyclic and aliphatic-alicyclic ketones having a primary or secondary alpha carbon atom, such as acetone, methyl ethyl ketone, methyl isopropyl ketone, methyl cyclohexyl ketone, ethyl cyclopentyl ketone, cyclohexanone, cyclopentanone, alpha-methyl cyclopentanone, and the like. As to the aldehydes, the alpha-substituted aldehydes having the general structure

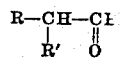

wherein R and R' represent aliphatic or cycloparaffinic groups, are especially suitable for use in the production of the unsaturated condensation products. Methyl propaldehyde, ethyl propaldehyde and cyclopentyl propaldehyde are a few of the simpler aldehydes which may be cited as examples of this group of suitable starting materials.

These unsaturated condensation products may be formed by the interaction of like or dissimilar ketones, or of a ketone with one or more aldehydes, or of similar or dissimilar aldehydes. Therefore, depending on the primary materials used, the unsaturated condensation products will be either unsaturated ketones or unsaturated aldehydes. These may be subjected to incomplete catalytic or non-catalytic hydrogenation, and then to the purification treatment disclosed and claimed herein.

We claim as our invention:

1. A process for recovering substantially pure methyl isobutyl ketone from mixtures thereof with mesityl oxide, which comprises commingling said mixture with an aqueous sodium hydroxide solution having a normality of between about 0.1N and 1.0N, subjecting the aqueous mixture thus formed to a temperature of about 150° C. and to a superatmospheric pressure sufficient to maintain a substantial portion of the reactants in a liquid state, thereby selectively converting the mesityl oxide into acetone, separately removing the acetone thus formed, and recovering substantially pure methyl isobutyl ketone from the remaining aqueous mixture.

2. A process for recovering substantially pure methyl isobutyl ketone from mixtures thereof with mesityl oxide which comprises commingling said mixture with a dilute aqueous sodium hydroxide solution, subjecting the aqueous mixture thus formed to a temperature of above 100° C. and to a superatmospheric pressure sufficient to maintain a substantial portion of the reactants in a liquid state, said temperature and pressure being below those at which substantial side reactions occur, thereby selectively converting the mesityl oxide into acetone, separately removing the acetone thus formed, and recovering substantially pure methyl isobutyl ketone from the remaining aqueous mixture.

3. A process for recovering substantially pure methyl isobutyl ketone from mixtures thereof with mesityl oxide, which comprises commingling said mixture with a dilute aqueous solution of a basic reacting compound, subjecting the aqueous mixture thus formed to a superatmospheric pressure at a temperature of above 100° C. but below that at which substantial side reactions occur, maintaining said temperature and pressure conditions for a period of time sufficient to selectively convert the mesityl oxide into acetone, removing the acetone from the reaction products, and separately recovering substantially pure methyl isobutyl ketone from the remaining reaction mixture.

4. The process according to claim 3 wherein the basic reacting solution employed has a basicity equal to that of an 0.1 to 1.0 normal aqueous solution of sodium hydroxide.

5. A process for producing substantially pure methyl isobutyl ketone which comprises condensing acetone to mesityl oxide, subjecting the mesityl oxide to a hydrogenation reaction to form a mixture consisting of methyl isobutyl ketone and unreacted mesityl oxide, commingling said mixture with an aqueous sodium hydroxide solution having a normality of between about 0.1N and 1.0N, subjecting the aqueous mixture thus formed to a temperature of above 100° C., at a superatmospheric pressure sufficient to maintain a substantial portion of the reactants in a liquid state, and for a period of time sufficient to convert the mesityl oxide into acetone, removing the acetone thus formed, and separately recovering the methyl isobutyl ketone in a substantially pure state from the remaining aqueous reaction mixture.

6. The process according to claim 5, wherein the aqueous sodium hydroxide solution is employed in a quantity in excess of that necessary to hydrolyze the mesityl oxide in the treated mixture.

7. A process for separating a saturated ketone from a mixture thereof with the corresponding alpha-beta unsaturated ketone, said ketones boiling within a relatively narrow boiling range, which comprises commingling said mixture with a dilute aqueous solution of a basic reacting compound, subjecting said mixture at a superatmospheric pressure to a temperature of above 100° C. but below that at which substantial side reactions occur, for a period of time sufficient to convert the unsaturated ketone into organic compounds having a widely different boiling temperature from that of the saturated ketone in the reaction mixture, and separately recovering the saturated ketone from the reaction mixture.

8. A process for recovering saturated ketones from mixtures thereof with the corresponding unsaturated ketones having substantially similar boiling temperatures, which comprises commingling said mixture with a dilute aqueous solution of a basic reacting compound, subjecting the aqueous mixture thus formed to a temperature of above 100° C. at a superatmospheric pressure sufficient to maintain a substantial portion of the reactants in the liquid state, thereby converting the unsaturated ketone into organic compounds having boiling temperatures which are widely different from the boiling temperature of the saturated ketone in the treated mixture, and separately recovering the saturated ketone in a substantially pure state from the reaction mixture.

9. A process for producing substantially pure saturated condensation products which comprises condensing compounds selected from the group consisting of aldehydes and ketones, hydrogenating the unsaturated products of condensation to form a mixture containing saturated and unsaturated condensation products, commingling said mixture with water and a basic-reacting catalyst, subjecting said aqueous mixture to a superatmospheric pressure and a temperature of above 100° C. for a period of time sufficient to effect the selective conversion of the unsaturated condensation product to the primary materials, separately removing said primary materials, and recovering a substantially pure saturated condensation product from the remaining reaction mixture.

10. A process for separating saturated carbonylic compounds from mixtures thereof with the corresponding unsaturated carbonylic compounds, which comprises commingling said mixture with a dilute aqueous solution of a basic-reacting compound, subjecting said aqueous mixture to a superatmospheric pressure and a temperature above 100° C. for a period of time sufficient to effect the selective and catalytic conversion of the unsaturated carbonylic compounds into organic compounds having boiling temperatures considerably below the boiling temperature of the saturated carbonylic compound in the treated mixture, and distilling the reaction products to recover separately the saturated carbonylic compound in a substantially pure state.

11. A process for separating saturated carbonylic compounds from mixtures thereof with the corresponding unsaturated carbonylic compounds, which comprises commingling said mixture with water and a basic-reacting compound, subjecting the aqueous mixture thus formed to a temperature above 100° C. and to a superatmospheric pressure, thereby selectively and catalytically converting the unsaturated carbonylic compounds into organic compounds having boiling temperatures which are widely different from the boiling temperature of the saturated carbonylic compound in the treated mixture, and separately recovering the saturated carbonylic compound.

SUMNER H. McALLISTER.
WILLIAM A. BAILEY, Jr.